(12) United States Patent
Yabe

(10) Patent No.: US 6,938,510 B2
(45) Date of Patent: Sep. 6, 2005

(54) BALL SCREW APPARATUS

(75) Inventor: Takayuki Yabe, Gunma (JP)

(73) Assignee: NSK Ltd., Tokyo (JP)

( * ) Notice: Subject to any disclaimer, the term of this patent is extended or adjusted under 35 U.S.C. 154(b) by 296 days.

(21) Appl. No.: 10/437,032

(22) Filed: May 14, 2003

(65) Prior Publication Data

US 2003/0213322 A1 Nov. 20, 2003

(30) Foreign Application Priority Data

May 15, 2002 (JP) ................................. P.2002-139892

(51) Int. Cl.[7] ............................................. F16H 25/22
(52) U.S. Cl. ................................. 74/424.82; 74/424.86
(58) Field of Search ........................ 74/424.82, 424.83, 74/424.84, 424.88

(56) References Cited

U.S. PATENT DOCUMENTS

| | | | | |
|---|---|---|---|---|
| 2,924,113 A | * | 2/1960 | Orner | 74/424.86 |
| 3,170,336 A | * | 2/1965 | Bohnhoff | 74/424.86 |
| 4,677,869 A | | 7/1987 | Mayfield | |
| 4,795,172 A | * | 1/1989 | Brande | 277/354 |
| 5,988,007 A | * | 11/1999 | Nishimura | 74/424.87 |

FOREIGN PATENT DOCUMENTS

| | | |
|---|---|---|
| DE | 199 52 714 A1 | 2/2001 |
| EP | 0 985 851 A1 | 3/2000 |

* cited by examiner

Primary Examiner—William C. Joyce
(74) Attorney, Agent, or Firm—Sughrue Mion, PLLC

(57) ABSTRACT

A ball screw apparatus, has a screw shaft including a screw groove; a nut fitted with the screw shaft, the nut including a screw groove and a ball return passage; a circulation piece including a ball circulation passage; and, a large number of balls, wherein, in the inner peripheral surface of the nut, a concave-shaped snap ring groove extending along the peripheral direction of the nut is formed, in the face of the circulation piece that faces the inside diameter side of the nut, a concave-shaped snap ring groove is formed so as to connect to the snap ring groove of the nut, and an outside diameter portion of a snap ring is fitted into the two snap ring grooves to thereby fix the circulation piece to the nut.

8 Claims, 4 Drawing Sheets

FIG. 2
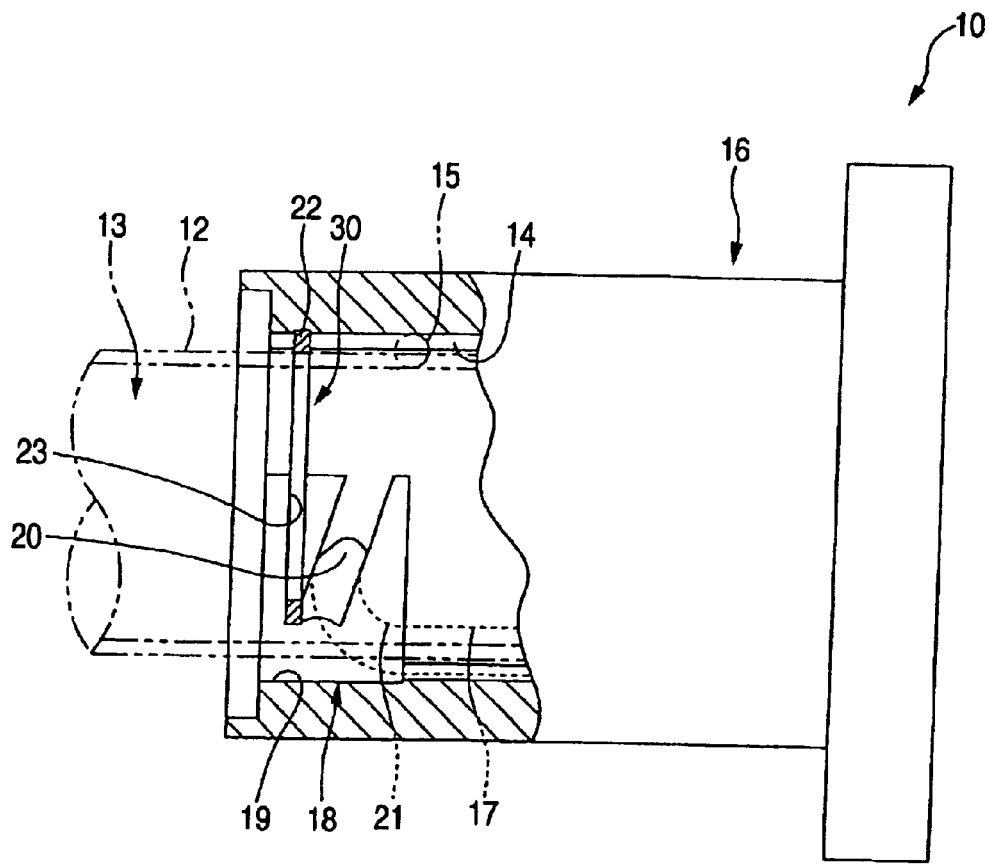
FIG. 3A  FIG. 3B  FIG. 3C  FIG. 3D
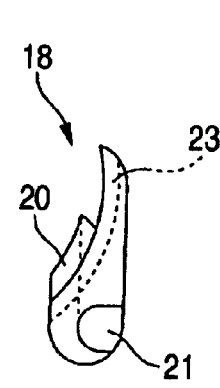 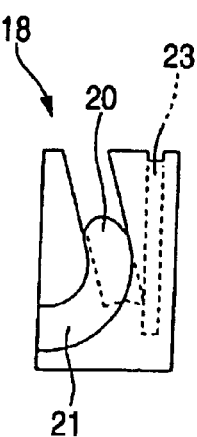 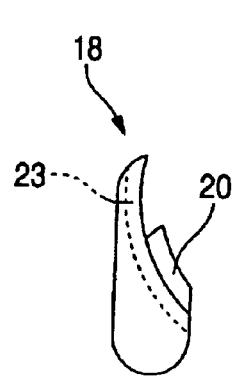 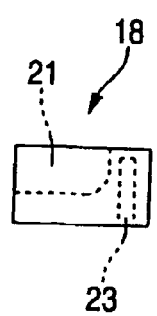

BALL SCREW APPARATUS

BACKGROUND OF THE INVENTION

1. Field of the Invention

The present invention relates to a ball screw apparatus which is used in industrial machines and the like.

2. Description of the Related Art

In a conventional ball screw apparatus of this type, a screw shaft includes a screw groove formed in the outer peripheral surface thereof and extends in the axial direction of the ball screw apparatus, a nut includes a screw groove formed in the inner peripheral surface thereof so as to correspond to the screw groove of the screw shaft, the nut is fitted with the screw shaft, and the screw groove of the nut and the screw groove of the screw shaft are opposed to each other to thereby form a spiral-shaped load raceway between them. In the load raceway, there are disposed a large number of balls in such a manner that they are able to roll and, due to rotation of the screw shaft (or nut), the nut (or screw shaft) can be moved in the axial direction of the ball screw apparatus through the rolling movements of the balls.

By the way, when the nut (or screw shaft) moves in the axial direction, the balls move while they are rolling along the spiral-shaped load raceway formed by the two screw grooves; however, in order to make the nut (or screw shaft) move continuously, the balls must be circulated endlessly.

As a method for circulating the balls endlessly, there are generally known a method of a circulation tube type and a method of an end cap type. In a ball screw apparatus of a compact type, in the nut, there is formed a ball return passage which penetrates through the nut in the axial direction thereof and, at the same time, a cut-away portion is formed in the end face of the nut, and a resin-made circulation piece including a ball circulation passage allowing the ball return passage and the load raceway formed between the two grooves is fitted with and fixed to the cut-away portion, whereby the load raceway, ball return passage and ball circulation passage cooperate together in forming an endless circulation passage for the balls.

Also, to fix the resin-made circulation piece to the end face of the nut, there is employed a method for screwing a setscrew from the end face side of the nut in the axial direction to thereby fix the circulation piece, or a method for setting a snap ring fitted into the inner peripheral portion of the end portion of the nut on a stepped portion formed on the nut end face side of the circulation piece to thereby fix the circulation piece.

However, in the above-mentioned conventional ball screw apparatus, since the resin-made circulation piece is fixed by screwing the setscrew from the end face side of the nut in the axial direction or by setting the snap ring fitted into the inner peripheral portion of the end portion of the nut on the stepped portion formed on the nut end face side of the circulation piece, there arise the following problems. That is, when the circulation piece is expanded and is then shrunk due to heat, in the case of the fixing method using the setscrew, the setscrew is loosened and, in the case of the fixing method using the snap ring, the circulation piece is shrunk in the axial direction; and, therefore, the circulation piece is shifted in the axial-direction position thereof. This shifts the position of the portion (that is, the leading end portion of the tongue portion) of the circulation piece where the balls are scooped up from the load raceway formed between the two screw grooves, or generates a clearance in the boundary portion between the ball circulation passage of the circulation piece and the ball return passage of the nut to thereby impede the smooth rolling motion of the balls, which lowers the reliability of the ball screw apparatus.

Also, in the case of the method in which the snap ring fitted into the inner peripheral portion of the end portion of the nut is set on the stepped portion formed on the nut end face side of the circulation piece, since the snap ring is simply placed on the stepped portion, when the circulation piece is shifted in position in the axial direction, there is a possibility that the snap ring can be removed out of position.

SUMMARY OF THE INVENTION

The present invention aims at eliminating the drawbacks found in the above-mentioned ball screw apparatus. Accordingly, it is an object of the present invention to provide a ball screw apparatus which can restrict the axial-direction position shift of the circulation piece due to heat to thereby be able to enhance the reliability of the ball screw apparatus.

In attaining the above object, according to the present invention as set forth in a first aspect, there is provided a ball screw apparatus having: a screw shaft including a spiral-shaped screw groove formed in an outer peripheral surface thereof; a nut fitted with the screw shaft, the nut including a screw groove formed in an inner peripheral surface thereof so as to correspond to the screw groove of the screw shaft and a ball return passage formed so as to penetrate through the nut in an axial direction thereof; a circulation piece fitted with an end face of the nut, the circulation piece including a ball circulation passage allowing the two screw grooves and the ball return passage to communicate with each other; and, a large number of balls circulatably loaded while rolling between the two screw grooves, along the ball return passage and the ball circulation passage, wherein, in the inner peripheral surface of the nut, a concave-shaped snap ring groove extending along the peripheral direction of the nut is formed, in the face of the circulation piece that faces the inside diameter side of the nut, a concave-shaped snap ring groove is formed so as to connect to the snap ring groove of the nut, and an outside diameter portion of a snap ring is fitted into the two snap ring grooves to thereby fix the circulation piece to the nut.

Also, according to the present invention as set forth in a second aspect, in a ball screw apparatus as set forth in the first aspect, the snap ring is made of resin or metal Further, according to the present invention as set forth in a third aspect, in a ball screw apparatus as set forth in the first or second aspect, retaining pieces or a connected body of the retaining pieces are interposed between the mutually adjoining ones of the large number of balls.

Further, it is preferable that the concave-shaped snap ring groove of the circulation piece may be formed at a position near to the axial-direction central portion of the circulation piece.

BRIEF DESCRIPTION OF THE DRAWINGS

FIG. 2 is a right side view of the ball screw apparatus, in part taken along the arrow line X—X shown in FIG. 1;

FIGS. 3(a)–3(d) show circulation pieces, specifically, FIG. 3B is a front view thereof, FIG. 3A a left side view of FIG. 3B, FIG. 3C is a right side view of FIG. 3B, and FIG. 3D is a bottom View of FIG. 3B:

FIG. 5A is a section view of a portion of a ball screw apparatus according to the present invention, and FIG. 5B is a section view of a portion of a conventional ball screw apparatus;

DETAILED DESCRIPTION OF THE PREFERRED EMBODIMENTS

Figure 1:
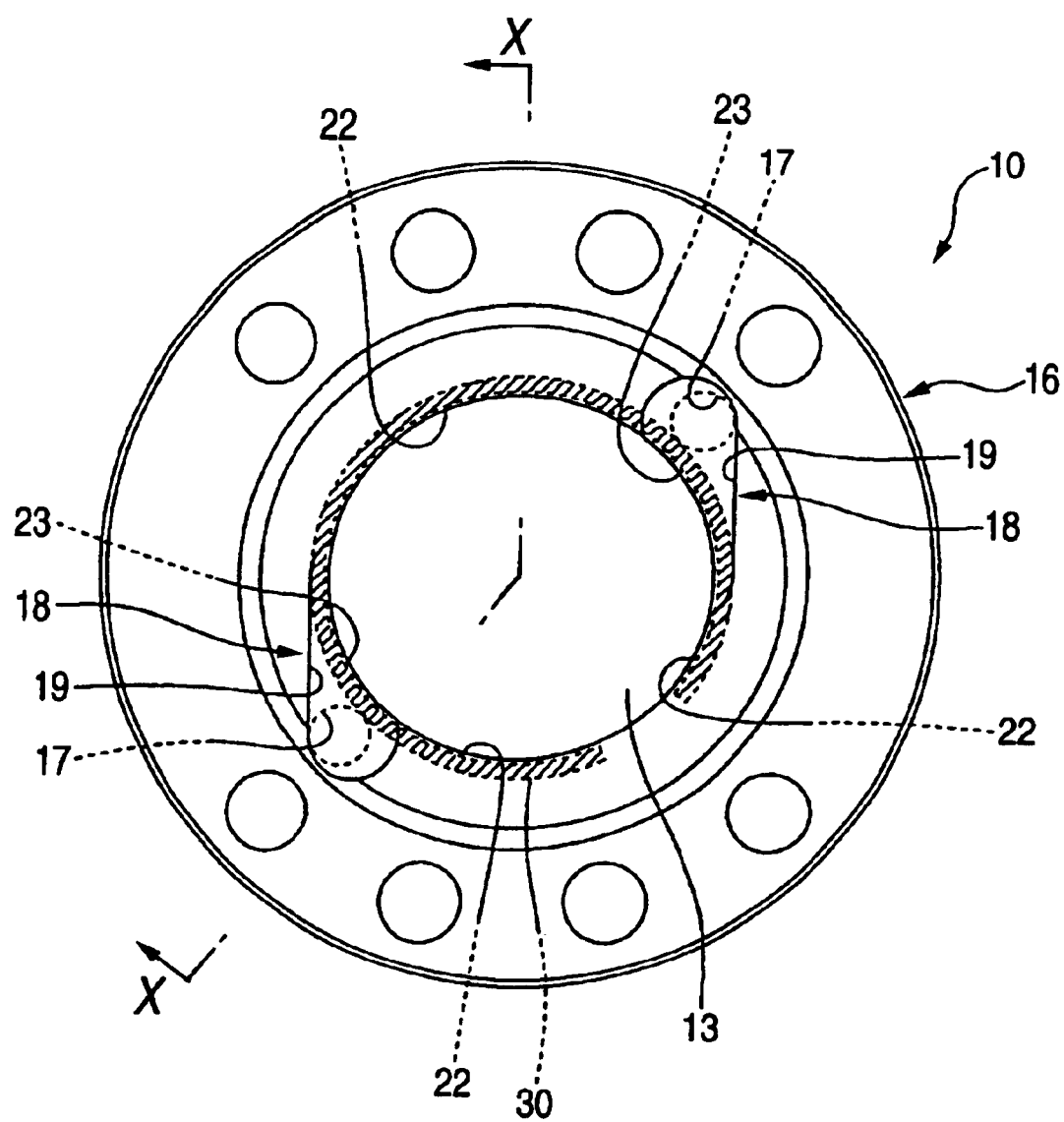
FIG. 1 is an explanatory view of an embodiment of a ball screw apparatus according to the present invention, when it is viewed from the axial direction thereof.
Figure 4:
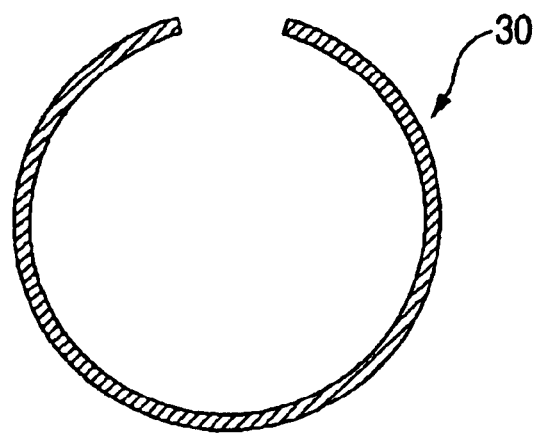
FIG. 4 shows a snap ring.
Figure 5A:
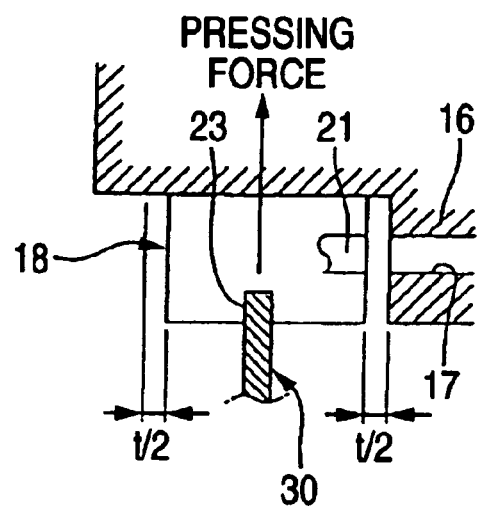
FIGS. 5(a)–5(b) are explanatory views of the operation effect of the present invention, specifically.
Figure 5B:
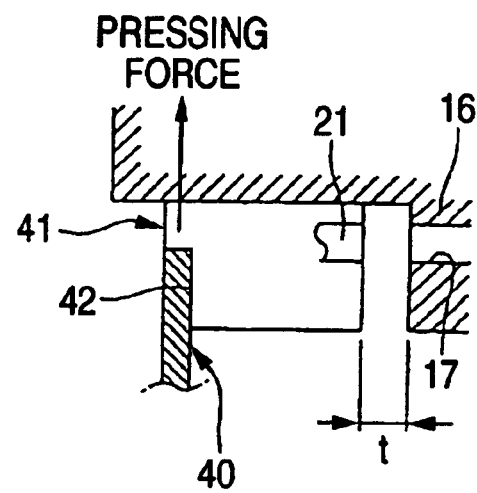
Figure 6:
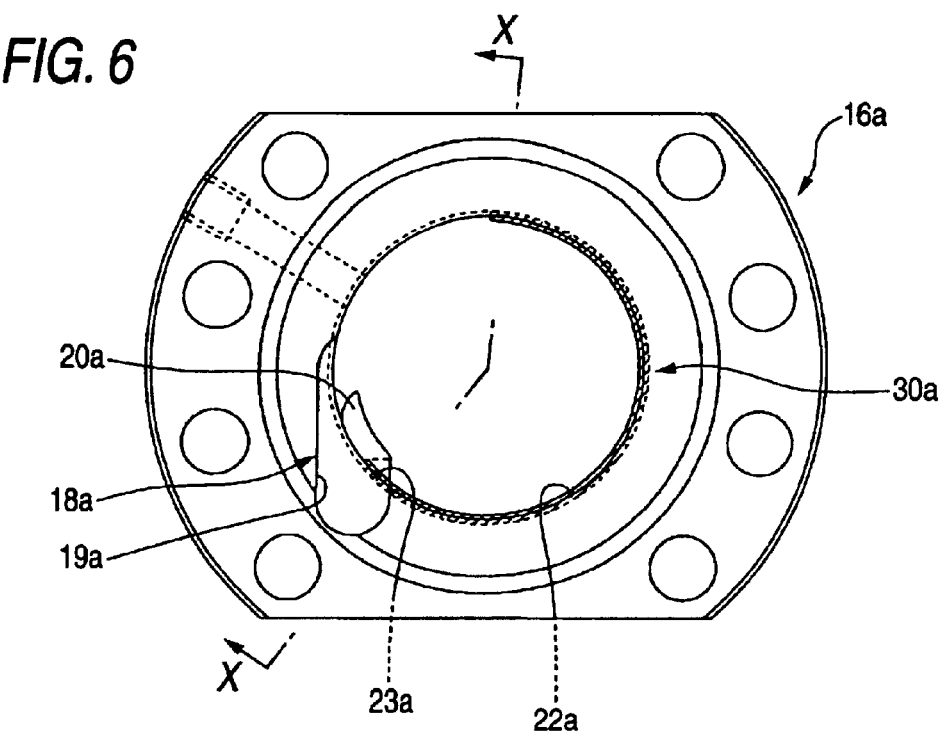
FIG. 6 is an explanatory view of a second embodiment of a ball screw apparatus according to the present invention, when it is viewed from the axial direction thereof.
Figure 7:
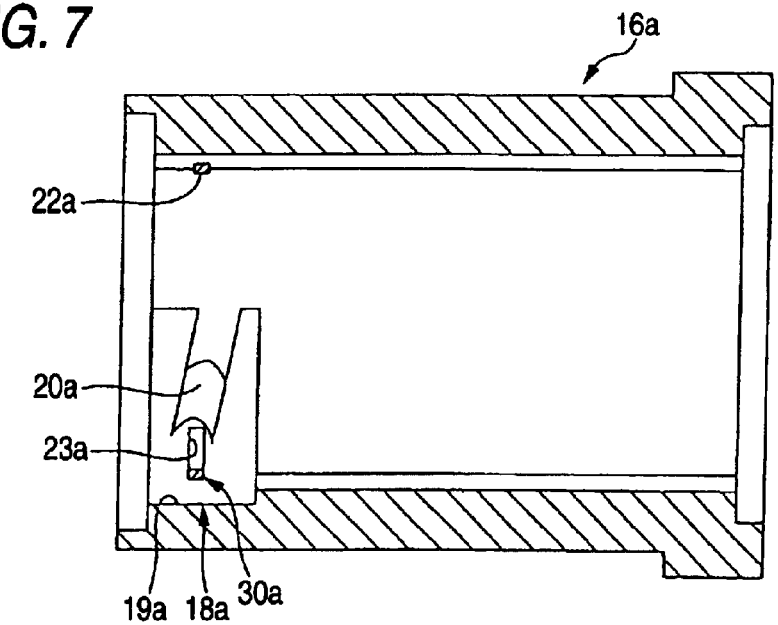
FIG. 7 is a section view taken along the arrow line X—X shown in FIG. 6.
Figure 8:
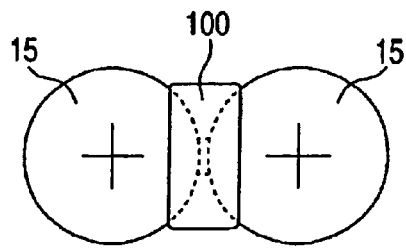
FIG. 8 shows an example of a retaining piece.

Now, description will be given below of an embodiment of a ball screw apparatus according to the present invention with reference to the accompanying drawings. FIG. 1 is an explanatory view of an embodiment of a ball screw apparatus according to the present invention, when it is viewed from the axial direction thereof; FIG. 2 is a right side view of the ball screw apparatus, in part taken along the arrow line X—X shown in FIG. 1; FIG. 3 shows a circulation piece, specifically, FIG. 3B is a front view thereof, FIG. 3A a left side view of FIG. 3B, FIG. 3C is a right side view of FIG. 3B, and FIG. 3D is a bottom view of FIG. 3B; FIG. 4 shows a snap ring; FIG. 5 is an explanatory view of the operation effect of the present invention, specifically, FIG. 5A is a section view of a portion of a ball screw apparatus according to the present invention, and FIG. 5B is a section view of a portion of a conventional ball screw apparatus; FIG. 6 is an explanatory view of a second embodiment of a ball screw apparatus according to the present invention, when it is viewed from the axial direction thereof; FIG. 7 is a section view taken along the arrow line X—X shown in FIG. 6; and, FIG. 8 shows an example of a retaining piece.

As shown in FIGS. 1 and 2, the present ball screw apparatus 10 comprises a screw shaft 13 including a spiral-shaped screw groove 12 formed in the outer peripheral surface thereof and extending in the axial direction of the ball screw apparatus 10 and a nut 16 including a screw groove 14 formed in the inner peripheral surface thereof as to correspond to the screw groove 12 formed in the screw shaft 13, while the nut 16 is fitted into the screw shaft 13.

The screw groove 14 of the nut 16 and the screw groove 12 of the screw shaft 13 are disposed opposed to each other to thereby form a spiral-shaped load raceway between them and, in the load raceway, there are disposed a large number of balls 15 serving as rolling bodies. And, as the screw shaft 13 (or nut 16) is rotated, the nut 16 (or screw shaft 13) is moved in the axial direction through the rolling motion of the balls 15.

In the wall portion of the nut 16, there is opened up a ball return passage 17 which penetrates through the nut 16 wall portion. And, in the two end faces of the nut 16, there are formed cut-away portions 19 into which a circulation piece 18 shown in FIG. 3 can be fitted, in such a manner that the two cut-away portions 19 communicate with the ball return passage 17 and a load raceway formed between the two screw grooves 12, 14.

The circulation piece 18 is composed of a molding which is made of, for example, synthetic resin; and, the circulation piece 18, as shown in FIG. 3, comprises a tongue portion 20 for scooping up the balls 15 rolling on the load raceway formed between the two screw grooves 12, 14, and a curved-shaped ball circulation groove (ball circulation passage) 21 allowing the ball return passage 17 to communicate with the load raceway formed between the two screw grooves 12, 14. The tongue portion 20, ball circulation groove 21, load raceway formed between the two screw grooves 12, 14, and ball return passage 17 cooperate together in forming an endless circulation passage for the balls 15.

And, in a state where the circulation piece 18 is fitted with and fixed to the cut-away portion 19, the circulation piece 18 is restricted not only in the diameter direction but also in the peripheral direction within the cut-away portion 19.

Here, in the present embodiment, at a position in the screw groove 14 formation portion of the inner peripheral surface of the end portion of the nut 16 that is shifted from the load raceway, there is formed a concave-shaped snap ring groove 23 along the circumferential direction of the nut 16 and, at the same time, in the surface of the circulation piece 18 that faces the inside diameter side of the nut 16, there is formed a concave-shaped snap ring groove 23 which extends along the snap ring groove 22 on the nut 16 side. By fitting the outside diameter portion of such a substantially C-shaped snap ring 30 as shown in FIG. 4 into the two snap ring grooves 22, 23, the circulation piece 18 is fixed to the end face of the nut 16 while the circulation piece 18 is restricted in the axial direction.

By the way, although the following structure depends on the shape of a circulation piece, in the present embodiment, in order to secure a space for formation of the snap ring groove 23 as near as possible to the axial-direction central portion of the circulation piece 18 facing the inside diameter side of the nut 16, the thickness of the side of the circulation portion 18 that faces the end face side of the nut 16 is set slightly larger than that of the remaining portions thereof. Therefore, the contact area (friction surface) of the circulation piece 18 with respect to the inner peripheral surface of the nut 16 is slightly wider than a conventional circulation piece. Also, the snap ring groove 22 on the nut 16 side continues with the peripheral-direction two sides of the snap ring groove 23 on the circulation piece 18 side, whereby the two snap ring grooves 22, 23 cooperate together in forming a C-like shape which corresponds to a snap ring 30.

As the snap ring 30, there can be used a snap ring having one of various section shapes such as a circular section shape or an angular-shaped section shape. In any case, in a state where the outside diameter portion of the snap ring 30 is fitted into the two snap ring grooves 22, 23, the snap ring 30 elastically presses the circulation piece 18 outwardly in the diameter direction thereof to thereby press the circulation piece 18 against the inner peripheral surface of the nut 16.

Also, as the material of the snap ring 30, depending on the productivity and temperature environment, there can be used synthetic resin (for example, polyacetal) or metal (for example, spring steel). In the case of a snap ring 30 made of synthetic resin, the snap ring 30 can be mass produced at a low cost, while it does not impair other parts nor raises a fear of seizure. Also, in case where the inner peripheral portion of the screw shaft 13 is slidingly contacted with the screw shaft 13, the snap ring 30 can also be used as a seal member. On the other hand, in the case of a snap ring 30 made of metal, since there is a fear that the snap ring 30 can damage the other parts, there is required a clearance between the inner peripheral portion of the snap ring 30 and screw shaft 13. However, because the snap ring 30 is excellent in strength, has a strong force going outwardly in the diameter direction of the circulation piece 18, and is high in thermal strength, the snap ring 30 can be used not only at a temperature of 100° C. or higher but also at a temperature of −40° C. or lower. Further, since the snap ring 30 is strong against shock, it is suitable for high speed rotation.

Next, description will be given below of the operation effects of the above-structured ball screw apparatus while it is compared with a conventional ball screw apparatus with reference to FIG. 5.

FIG. 5A shows a ball screw apparatus according to the present invention in which, for convenience of explanation, the snap ring groove 23 is formed substantially in the axial-direction central portion of the circulation piece 18 and, as described before, by fitting the outside diameter portion of the snap ring 30 into the two snap ring grooves 22, 23, the circulation piece 18 is fixed to the nut 16 so as to be restricted in the axial direction thereof. On the other hand, FIG. 5B shows a conventional ball screw apparatus in which a snap ring 40 fitted into the inner peripheral portion of the end portion of the nut 16 is set on a stepped portion 42 formed on the nut 16 end face side of a circulation piece 41 to thereby fix the circulation piece 41 to the nut 16.

As described above, in the conventional ball screw apparatus, the circulation piece 41 is restricted from the end face side of the nut 16 by the snap ring 40. On the other hand, in the ball screw apparatus according to the present invention, the circulation piece 18 is restricted at a position near to the axial-direction central portion of the circulation piece 18 by the snap ring 30.

This means that, when the circulation piece is expanded and is then shrunk, according to the present invention, the position shift of the circulation piece is reduced down to about one half of the position shift of the circulation piece in the conventional structure.

In other words, for example, when the circulation piece is shrunk by 1 mm in the axial direction, in the conventional structure in which the circulation piece 41 is restricted on the end face side of the nut 16, there is generated a clearance (in FIG. 5B, it is shown in an enlarged manner) t=1 mm between the ball circulation groove 21 of the circulation piece 41 and the ball return passage 17 of the nut 16. On the other hand, in the structure according to the present invention in which the circulation piece 18 is restricted in the axial-direction central portion of the circulation piece 18, the shrinkage amount of 1 mm is dispersed to the axial-direction two end sides of the circulation piece 18 to generate a clearance t/2=0.5 mm between the ball circulation groove 21 of the circulation piece 18 and the ball return passage 17 of the nut 16, which makes it possible to restrict the axial-direction position shift of the circulation piece 18 due to heat.

As described above, according to the present embodiment, since the axial-direction position shift of the circulation piece 18 due to heat can be restricted more than the conventional structure, not only the position shift of the scoop-up portion (tongue portion leading end portion) for scooping up the balls 15 from the load raceway formed between the two screw grooves 12, 14 of the circulation piece 18 but also a clearance to be generated in the boundary portion between the ball circulation groove 21 of the circulation piece 18 and the ball return passage 17 of the nut 16 can be minimized. As a result of this, the smooth rolling movements of the balls 15 can be secured, which makes it possible to enhance the reliability of the ball screw apparatus.

Also, because the circulation piece 18 is positively pressed toward the nut 16 side in the diameter direction with a larger force than in the conventional structure and also because, as described above, the contact area of the circulation piece 18 with respect to the inner peripheral surface of the nut 16 is slightly wider than the conventional structure, the pressing force of the circulation piece 18 acts on the nut 16 side in a wider area to thereby increase the frictional force. Further, because the snap ring 30 is fitted into the concave-shaped snap ring groove 23 of the circulation piece 18, there is no fear that the snap ring 30 can be removed out of position.

By the way, the structures of the screw shaft, nut, circulation piece, snap ring groove, snap ring and the like of the ball screw apparatus according to the present invention are not limited to the above embodiment but they can be changed properly without departing from the subject matter of the present invention.

For example, in the above embodiment, there is employed a case in which the concave-shaped snap ring groove 23 is formed on the end face side of the nut 16 near to the axial-direction central portion of the circulation piece 18 and the snap ring 30 is fitted into the snap ring groove 23 and the snap ring groove 22 of the nut 16. However, this is not limitative but, as shown in FIGS. 6 and 7, a concave-shaped snap ring groove 23a may be formed in the axial-direction central portion of a circulation piece 18a and a snap ring 30a may be fitted into the snap ring groove 23a and a snap ring groove 22a formed on the nut 16a side. In this case, in FIGS. 6 and 7, reference character 19a designates a cut-away portion which is formed in the end face of the nut 16a and also to which the circulation piece 18a can be fitted and fixed, and 20a stands for the tongue portion of the circulation piece 18a.

Also, between the mutually adjoining ones of the large number of balls 15 which roll along the load raceway between the two screw grooves 12, 14, as shown in FIG. 8, there may be interposed a retaining piece 100 including arc-shaped or conical-shaped concave surfaces on the two side surfaces thereof opposed to the balls 15, in order to be able to eliminate collision sounds between the balls when driven to thereby reduce the noise of the ball screw apparatus. By the way, the retaining piece may be composed of individual retaining pieces which are separately interposed between the balls, or may be composed of a connected body of retaining pieces. In these cases, the position shift and clearance between the circulation piece 18 and nut 16 can be reduced, thereby being able to prevent the retaining pieces 100 and the connected body thereof from being caught.

As can be seen clearly from the foregoing description, according to the present invention, not only the axial-direction position shift of the circulation piece due to heat can be restricted more than in the conventional ball screw apparatus but also there is eliminated a fear that the snap ring can be removed out of position. Therefore, there can be obtained the effect that the smooth rolling movements of the balls can be secured and thus the reliability of the ball screw apparatus can be enhanced.

What is claimed is:

1. A ball screw apparatus, comprising:
 a screw shaft including a spiral-shaped screw groove formed in an outer peripheral surface thereof;
 a nut fitted with the screw shaft, the nut including a screw groove formed in an inner peripheral surface thereof so as to correspond to the screw groove of the screw shaft and a ball return passage formed so as to penetrate through the nut in an axial direction thereof;
 a circulation piece fitted with an end face of the nut, the circulation piece including a ball circulation passage allowing the two screw grooves and the ball return passage to communicate with each other; and, a large number of balls circulatably loaded while rolling between the two screw grooves, along the ball return passage and the ball circulation passage, wherein, in the inner peripheral surface of the nut, a concave-shaped snap ring groove extending along the peripheral direction of the nut is formed, in the face of the circulation piece that faces the inside diameter side of the nut, a concave-shaped snap ring groove is formed so as to connect to the snap ring groove of the nut, and an outside diameter portion of a snap ring is fitted into the two snap ring grooves to thereby fix the circulation piece to the nut.

2. The ball screw apparatus as set forth in claim 1, wherein the snap ring is made of resin or metal.

3. The ball screw apparatus as set forth in claim 2, wherein retaining pieces or a connected body of the retaining pieces are interposed between the mutually adjoining ones of the large number of balls.

4. The ball screw apparatus as set forth in claim 3, wherein the concave-shaped snap ring groove of the circulation piece is formed at a position near to the axial-direction central portion of the circulation piece.

5. The ball screw apparatus as set forth in claim 2, wherein the concave-shaped snap ring groove of the circulation piece is formed at a position near to the axial-direction central portion of the circulation piece.

6. The ball screw apparatus as set forth in claim 1, wherein retaining pieces or a connected body of the retaining pieces are interposed between the mutually adjoining ones of the large number of balls.

7. The ball screw apparatus as set forth in claim 3, wherein the concave-shaped snap ring groove of the circulation piece is formed at a position near to the axial-direction central portion of the circulation piece.

8. The ball screw apparatus as set forth in claim 1, wherein the concave-shaped snap ring groove of the circulation piece is formed at a position near to the axial-direction central portion of the circulation piece.

* * * * *